(12) United States Patent
Cimatti (10) Patent No.: US 12,325,464 B2
(45) Date of Patent: Jun. 10, 2025

(54) ADJUSTABLE STEERING COLUMN FOR A VEHICLE

(71) Applicant: Hangzhou Kingway Technology Co., Ltd., Zhejiang (CN)

(72) Inventor: Franco Cimatti, Modena (IT)

(73) Assignee: Hangzhou Kingway Technology Co., Ltd., Zhejiang (CN)

( * ) Notice: Subject to any disclaimer, the term of this patent is extended or adjusted under 35 U.S.C. 154(b) by 0 days.

(21) Appl. No.: 18/621,080

(22) Filed: Mar. 28, 2024

(65) Prior Publication Data

US 2024/0262411 A1     Aug. 8, 2024

Related U.S. Application Data

(63) Continuation of application No. PCT/EP2021/076853, filed on Sep. 29, 2021.

(51) Int. Cl.
    *B62D 1/185*     (2006.01)
(52) U.S. Cl.
    CPC .................... *B62D 1/185* (2013.01)
(58) Field of Classification Search
    CPC ................ B62D 1/185; B62D 5/001
    See application file for complete search history.

(56) References Cited

U.S. PATENT DOCUMENTS

| 10,479,393 | B2 * | 11/2019 | Sakayanagi | ............... F16F 3/02 |
| 2015/0090067 | A1 * | 4/2015 | Iwakawa | ............... B62D 1/181 74/493 |
| 2016/0252133 | A1 * | 9/2016 | Caverly | ............... B62D 1/185 74/493 |

FOREIGN PATENT DOCUMENTS

| BE | 1029838 A1 | * | 5/2023 | | |
| CN | 1745013 A | * | 3/2006 | ............ | B62D 1/185 |
| CN | 116534112 A | * | 8/2023 | ............ | B62D 1/185 |
| DE | 102020203210 A1 | * | 9/2021 | ............ | B62D 1/181 |
| DE | 102022119869 A1 | * | 2/2024 | ............ | B62D 1/185 |
| EP | 0446428 A2 | * | 9/1991 | | |
| EP | 1506110 | | 2/2005 | | |
| EP | 1873038 A2 | * | 1/2008 | ............ | B62D 1/185 |
| JP | WO2003031250 A1 | * | 1/2005 | | |
| JP | 2008290491 | | 12/2008 | | |
| WO | WO-2020007723 A1 | * | 1/2020 | ............ | B62D 1/181 |
| WO | 2020032130 | | 2/2020 | | |

(Continued)

OTHER PUBLICATIONS

"International Search Report (Form PCT/ISA/210) of PCT/EP2021/076853", mailed on Jun. 20, 2022, pp. 1-3.

(Continued)

*Primary Examiner* — Drew J Brown
(74) *Attorney, Agent, or Firm* — JCIPRNET (57) ABSTRACT

The present disclosure relates to a steering column for a vehicle, with: —an inner steering column element that is received in an outer steering column element, the inner and outer steering column element being displaceable relative to one another along a displacement axis; —at least one preload force generating element that is configured to generate a preload force to set a defined resistance against the relative displacement; where the inner steering column element has a number of side faces which form a hollow cross-section of the inner steering column element; where at least a portion of a side face of the number of side faces has a protruding shape.

16 Claims, 2 Drawing Sheets

(56) References Cited

FOREIGN PATENT DOCUMENTS

WO    WO-2024041693 A1 *  2/2024  ............. B62D 1/185

OTHER PUBLICATIONS

"Written Opinion of the International Searching Authority (Form PCT/ISA/237) of PCT/EP2021/076853", mailed on Jun. 20, 2022, pp. 1-6.

* cited by examiner

ADJUSTABLE STEERING COLUMN FOR A VEHICLE

CROSS-REFERENCE TO RELATED APPLICATIONS

This application is a continuation of International Application No. PCT/EP2021/076853, filed on Sep. 29, 2021, which is hereby incorporated by reference in its entirety.

TECHNICAL FIELD

The present disclosure relates to a steering column for a vehicle, such as a car or a truck.

BACKGROUND

Steering columns generally serve to support a steering wheel, e.g. by coupling it to the chassis of a vehicle.

Adjustable steering columns are generally known in the prior art. The adjustability typically allows for a changing position of the steering wheel relative to the driver. This way, the driver can position the steering wheel according to his ergonomic preferences. Further or alternatively, in a steer-by-wire arrangement in autonomous or semi-autonomous vehicles, the adjustability can allow for changing a position of the steering wheel from a retracted position (during autonomous driving) and an extended position (during manual driving).

One type of adjustability concerns moving the steering wheel back and forth in a forward driving direction relative to the driver. Put differently, a driver and/or an actuator can move the steering wheel towards the driver (extended state) and away from the driver towards a dashboard (retracted state).

For doing so, existing steering columns may comprise telescopic structures with several steering column elements that are linearly displaceable relative to one another. In order to set a defined force that needs to be overcome for achieving said linear displacement preload elements such as screws may be provided. These exert a preload force on at least one of the steering column elements which results in a frictional resistance.

One example of a known steering column can be found in JP 2008-290491 A1.

It has been determined that existing linearly displaceable steering columns are often heavy and bulky. This results from a need to make the steering column sufficiently stiff. Accordingly, the weight, costs and complexity are increased.

It is therefore an object of the present application to provide an adjustable steering column having desired mechanical characteristics, in particular in terms of stiffness, at a limited weight and at a limited volume.

This object is achieved by the subject matter of the independent claims. Other embodiments and other features are specified in the dependent claims and the following description.

SUMMARY

The present disclosure relates to a steering column for a vehicle and in particular for a steer-by-wire steering system of the vehicle.

The steering column has an inner steering column element that is received in an outer steering column element of the steering column, the inner and outer steering column elements being linearly displaceable relative to one another along a displacement axis.

The steering column has at least one preload force generating element that is configured to set a defined resistance against the relative displacement of the inner and outer steering column element, e.g. by generating resistance and/or frictional forces acting against said relative displacement.

The inner steering column element has a number of side faces, e.g. at least a first to fourth side face, which form (or, put differently, enclose, define or bound) a hollow cross-section of the inner steering column element.

At least a portion of a first side face has a protruding shape. According to an example, said at least one portion protrudes towards the preload force generating element. The preload force is introduced into said at least one protruding portion of the first side face and/or said portion is positioned opposite to said preload force generating element.

The steering column may be connected or connectable to a rigid member of the vehicle. In one example, it is at least indirectly coupled or couplable to a chassis of the vehicle.

Additionally or alternatively, the steering column may be connected or connectable to a steering wheel, in particular so that the steering wheel is rotatable relative to the steering column. In an embodiment, this is done by the steering column being connected to and/or including at least one rotational bearing that is coupled to the steering wheel. For example, the steering column and in particular an end portion of the inner steering column element facing away from the outer steering column element may rotatably support the steering wheel. This may be done at an outer circumferential surface of the steering column element.

In an embodiment, the steering column is configured to be used in a steer-by-wire steering system in which there is no direct mechanical connection between the steering wheel and steering gears and/or steerable wheels of the vehicle.

Generally, supporting the steering wheel at an outer circumference of the steering column means that the interior space of the steering column is less obstructed. Accordingly, this space can be used for different purposes. According to one embodiment it is used for receiving electronic components e.g. of the overall steering system. This helps to reduce space requirements and complexity. For example, there may not be a shaft connected to the steering wheel and by means of which rotations of the steering wheel are directly conveyed to a steering gear or the like. Instead, according to known steer-by-wire principles, rotations of the steering wheel may be sensed and an electro-mechanical actuator connected to the steering gear and/or wheels of the vehicle (but not being mechanically connected to the steering wheel) may be controlled based on these sensed rotations to execute a steering command and steer the wheels accordingly.

Therefore, according to an example, the steering column does not receive and/or is free of any components (such as the above shaft) rigidly connected to the steering wheel (i.e. that rotate jointly therewith). In particular, the steering column may be free of any rotatable supports and/or connections to the steering wheel at its inner circumferential face and/or within an interior space of the steering column.

Nonetheless, the steering column disclosed herein can also support and/or be connected to a shaft connected to the steering wheel, said shaft being at least partially inserted into or received by the steering column. For example, the shaft may be rotatably supported within a hollow cross-section of the steering column and in particular the inner steering column element. The shaft may rotate jointly with the steering wheel. It may be connected to a steering gear e.g.

by an intermediate cardan shaft, thereby e.g. being mechanically coupled to steerable wheels of the vehicle.

The inner steering column element and outer steering column element may both be elongated members. They may be made from a metallic material. The may e.g. be hollow elongated profiles. They may be similarly shaped and may in particular have similarly shaped cross sections. At least those portions of the cross sections of the inner and outer steering column element that are directly opposite to one another may be similarly shaped. For example, an inner circumferential surface of the cross-section of the outer steering column element may be shaped according to an outer circumferential surface of the cross-section of the inner steering column element. By having cross-sections with matching shapes, the inner steering column element can be reliably supported and guided within the outer steering column element.

The cross-sections of the inner and outer steering column element may be formed in a plane extending orthogonally to the displacement axis.

One of the steering column elements (for example, the outer steering column element) may generally be fixed or fixable within the vehicle and/or may be non-displaceable along the displacement axis. Accordingly, only one of the steering column elements (for example, the inner steering column element) may be linearly displaceable along the displacement axis.

According to a further example, the inner steering column element and in particular the first side face may comprise at least one sliding surface. The sliding surface may be made from a different material compared to the remainder of the inner steering column element, e.g. from a softer metal or from a polymeric material. The sliding surface may be arranged at an outer surface of one of the side faces. In an embodiment, the sliding surface may be formed by an elongated piece of material that extends along the displacement axis.

The protruding portion may extend along and/or form the complete first side face. Put differently, the first side face may generally protrude, towards the preload force generating element. Alternatively, the protruding portion may be formed as a local projection within the first side face. According to an example, the first side face has angled sections that converge towards each other, thereby forming a generally outwardly protruding shape (e.g. a V-shape) of the first side face.

The preload force generating element can also be referred to as a clamping force generating element or a resistance force generating element. It may extend through and/or be inserted into an opening within the outer steering column element. It may contact said first side face and in particular a sliding surface provided thereat. It may exert a preload force onto the first side face and in particular onto a sliding surface provided thereat. As a result, a resistance force e.g. in form of a frictional force may be generated at and/or in the area of the sliding surface. This resistance force may be the force acting against the relative displacement.

Generally, the preload force generating element may be configured to variably set the force that acts against the relative displacement, e.g. by varying a degree of tightening the preload force generating element. During production or maintenance of the steering column a resistance force out of a possible range of resistance forces may be set by the tightening preload force generating element to a predetermined degree.

The first side face may generally be non-planar and/or non-straight due to its protruding shape. Its at least one protruding portion may form a local projection of and within the first side face that e.g. projects relative to further portions of the side face (e.g. relative to outer edges thereof, see below). In one example, the at least one protruding portion forms an outermost and/or lowermost portion of the first side face.

The further side faces of the inner steering column element may be differently formed compared to the first side face. For example, they may be substantially protrusion free and/or straight or flat. The side faces may be connected to one another or merge with each other at angled or rounded corner portions of the cross-section.

By providing a respectively protruding first side face, the distribution of forces and stresses within the inner steering column element is improved when being exposed to the preload force.

Specifically, it has been determined that compared to providing the first side face with a substantially planar shape, the received preload force results to a higher degree in compression stresses within the first side face. In the theoretical planar case, the first side face would experience bending as a main deformation and main load case. This would have to be compensated for by increasing a thickness of the first side face to achieve a desired stiffness. However, this would result in an increase of weight.

Although providing the protruding first side face disclosed herein may at a first glance, be perceived to complicate the design and/or increase the dimensions and thus weight of the steering column, it has been determined that its beneficial stress distribution allows for using less material. This in fact helps to reduce weight. Specifically, the outwardly protruding first side face can be made thinner compared to a theoretically alternative planar configuration thereof while still achieving a sufficient or even improved stiffness.

When, providing the outer steering column element with a hollow cross-section that is correspondingly shaped to that of the inner steering column element, a force distribution in the outer steering column element can equally be improved. For example, at least a shape of a side face of said cross section that is opposite to the first side face of the inner steering column element can be correspondingly shaped. As a result, compared to a (theoretical) planar shape of said opposite side face of the outer steering column element, a degree of bending can be reduced and e.g. tension loading can be increased. This may similarly allow for reducing the thickness of said side face, thereby reducing weight.

In one example, the thickness is less than 30 mm, e.g. between 1 mm and up to 20 mm or between 1 mm and up to 10 mm.

In an embodiment, the first side face protrudes outwardly, e.g. with respect to a geometric centre of the cross-section. Alternatively, the side face may protrude inwardly, e.g. by having an inverted V-shape. Such an inwardly extending protrusion equally helps to reduce bending of the first side face. However, an outwardly protrusion can be advantageous in view of providing interior space where to locate other elements of the system, and in view of providing a geometrically less complex structure compared to an inwardly protruding portion.

According to an embodiment, the hollow cross-section has a polygonal and/or a substantially rectangular shape. For example, the cross-section comprises at least four side faces that are connected to define a substantially rectangular shape. The latter may include that at least two side faces (e.g.

left and right side faces or top and bottom side faces) are similarly shaped and/or extend substantially parallel to one another.

The first side face may form a longer side of the rectangular shape. It may e.g. be at least 1.2 times or at least 1.5 times as long as the further side faces directly connected and extending at an angle thereto. This further helps to improve stiffness. For example, the first side face may be between 30 mm and 150 mm long.

In one example, two parallel further side faces are provided that are connected to one another by the first side face. Said parallel side faces may also be connected by a further side face that is oriented similarly to the first side face, e.g. due to both extending substantially at similar angles relative to the parallel side faces.

It is noted that positional and/or directional terms such as left, right, bottom, top, horizontal and vertical used herein may generally relate to an installation orientation and installation position of the steering column in the vehicle and when viewed by a driver.

According to a further aspect, at least one of the side faces other than the first side face has a substantially planar shape and e.g. may be free of a similarly protruding portion. With respect to the cross-section of the inner steering column element, said side faces may define a straight portion and in particular a straight edge of the cross-section. In an embodiment, the majority of further side faces or even all further side faces have a respective substantially planar shape. By providing at least one planar side face the strength and compactness of the inner steering column element is improved.

According to a further aspect, the first side face has two outer edge portions (e.g. extending along the displacement axis) and which are each connected to (and/or each merge with) a further side face of the inner steering column element (e.g. a first outer edge portion of said two outer edge portions may be connected to a first further side face and a second outer edge portion of said two outer edge portions to a second further side face). The edge portions may define opposite outer edges of the first side face when viewed in the cross-sectional plane. The at least one protruding portion and/or a (for example, centre) portion of the first side face may be located in between these edges and in particular substantially in a middle between them. The edge portions may connect to and/or be part of corner portions to which the respectively adjacent further side faces are connected.

In an embodiment, at least a portion of the first side face that is opposite to the preload force generating element protrudes relative to these outer edge portions. In particular, said opposite portion and the outer edge portions may not be positioned along one common line (e.g. when viewed in the cross-sectional plane). For example, at most the outer edge portions may be located on a respective common line, while said opposite portion is at a distance to said line and e.g. displaced relative thereto towards the preload force generating element.

Put differently, the opposite portion may be arranged closer to the preload force generating element then the outer edge portions e.g. when viewed along an axis extending orthogonally to the displacement axis and/or along which the preload force is introduced. Again, the opposite portion may be a centre portion of the first side face when viewed in the cross-sectional plane.

Additionally or alternatively, the first side face may generally have V- or U-shape e.g. when viewed in the cross-sectional plane. The opposite portion may form a respective bottom of the V- or U-shape, whereas the outer edge portions may form the upper end and starting point of said V- or U-shape.

With such a shape, as well as any of the further angled shapes discussed herein, an advantageous stress distribution can be achieved within the inner steering column element that allows for reducing a material thickness while maintaining a required stiffness.

According to further embodiment, the first side face has an angled shape, e.g. when viewed in the cross-sectional plane. This may be achieved by providing any of the above relative arrangements of a centre or opposite portion and outer edge portions of the first side face and/or by providing the first side face with the above discussed V-shape. Specifically, the first side face may comprise at least two angled sections that converge, thereby providing an outwardly protruding shape of the first side face.

The generated preload force may act along a preload axis. A shape of the first side face may be angled with respect to an axis extending orthogonally to said preload axis. In particular, said axis may also extend orthogonally to the displacement axis. The preload axis may extend within the cross-sectional plane and/or orthogonally to the displacement axis. It may extend substantially orthogonally to at least one side face of the inner steering column element. In one example, the preload axis is a substantially horizontal or vertical spatial axis. The preload axis may extend along the preload force generating element and coincides with a longitudinal axis thereof.

According to an aspect, the first side face includes at least two angled sections that are mirror symmetric with respect to the preload axis. Specifically, an angle of each angled section with respect to an axis extending orthogonally to the preload axis and to the displacement axis is between 0.5° and 60°, or between 10° and up to 50° or between 20° and up to 45°. The hollow cross-section (or at least the first side face thereof) of the inner and/or outer steering column element may generally be mirror symmetric with respect to the preload axis.

The first side face may be a top or bottom side face of the inner steering column element. The term top or bottom may again relate to an installation orientation of the steering column within the vehicle. With such an orientation of the first side face, a secure preloading of the steering column is achieved while enabling a comfortable axial displacement thereof.

In one aspect, the preload force generating element is a screw or comprises a screw. The outer steering column element may comprise a threaded through hole in which the screw is received. By tightening and loosening the screw a degree by which it extends out of said through hole and towards the first side face can be varied. This degree may determine the extent of the preload force that is received by the first side face and thus the extent of generated resistance forces which counteract the axial displacement.

As mentioned above, the first side face may comprise at least one sliding surface into which the preload force is introduced and/or that is contacted by the preload force generating element.

According to a further embodiment, at least two further sliding surfaces are provided that are each positioned at a corner portion of the hollow cross-section of the inner steering column element. The first side face may extend at distance to said corner portions and/or may not be directly connected thereto due to being spaced apart therefrom by at least one intermediate further side face. The corner portions may be formed by two side faces joining one another and/or may form a connecting portion between such two side faces. These side faces may extend angle to one another that is e.g. larger than 45°. In one example, said side faces extend substantially orthogonally to one another. The corner portions may be rounded or angled. They may comprise or be connected to a sliding surface that is in contact with the outer steering column element.

The sliding surfaces may form the only areas of contact between the inner steering column element and the outer steering column element and/or the preload force generating element. By means of the optional further sliding surfaces provided at the corner portions, the inner steering column element can be reliably centred within the outer steering column element.

As indicated above, at least portions of the inner and outer steering column element may be similarly shaped. For example, the outer steering column element may have a number of side faces which form a hollow cross-section of the outer steering column element, said cross-section receiving the inner steering column element. A side face of the outer steering column element that is adjacent to the first side face of the inner steering column element may be correspondingly shaped to said first side face. In particular, an inner surface facing the inner steering column element of said side face may be shaped correspondingly to an outer surface of the first side face of the inner steering column element. For example, said side face of the outer steering column element may be similarly angled.

Additionally or alternatively, the protruding portion of the first side face of the inner steering column element may at least partially be received within said similarly shaped side face of the outer steering column element, in particular wherein said similarly shaped side face forms a recess and/or a dent or indentation due to its corresponding (e.g. angled) shape.

Providing respective corresponding shapes increases compactness. Further, when said similarly shaped side face of the outer steering column element receives the preload force generating element, an advantageous stress distribution and in particular a predominant tension loading can be achieved. This allows for reducing a material thickness (e.g. compared to planar shape and predominantly bent load case) while maintaining a sufficient stiffness. Again, the thickness may be less than 30 mm, e.g. between 1 mm and up to 20 mm or between 1 mm and up to 10 mm.

The present disclosure also relates to a steering system for a vehicle, the steering system is a steer-by-wire steering system and comprises:
a steering column according to any of the previous claims;
a steering wheel coupled to the inner steering column element (e.g. at an outer circumferential surface of the inner steering column element) and being rotatable relative thereto.

BRIEF DESCRIPTION OF THE DRAWINGS

For a better understanding of embodiments of the present disclosure and to show how the same may be carried into effect, reference will now be made, purely by way of example, to the accompanying drawings in which like numerals designate corresponding elements or sections throughout.

In the accompanying drawings.

DESCRIPTION OF THE EMBODIMENTS

Figure 1:
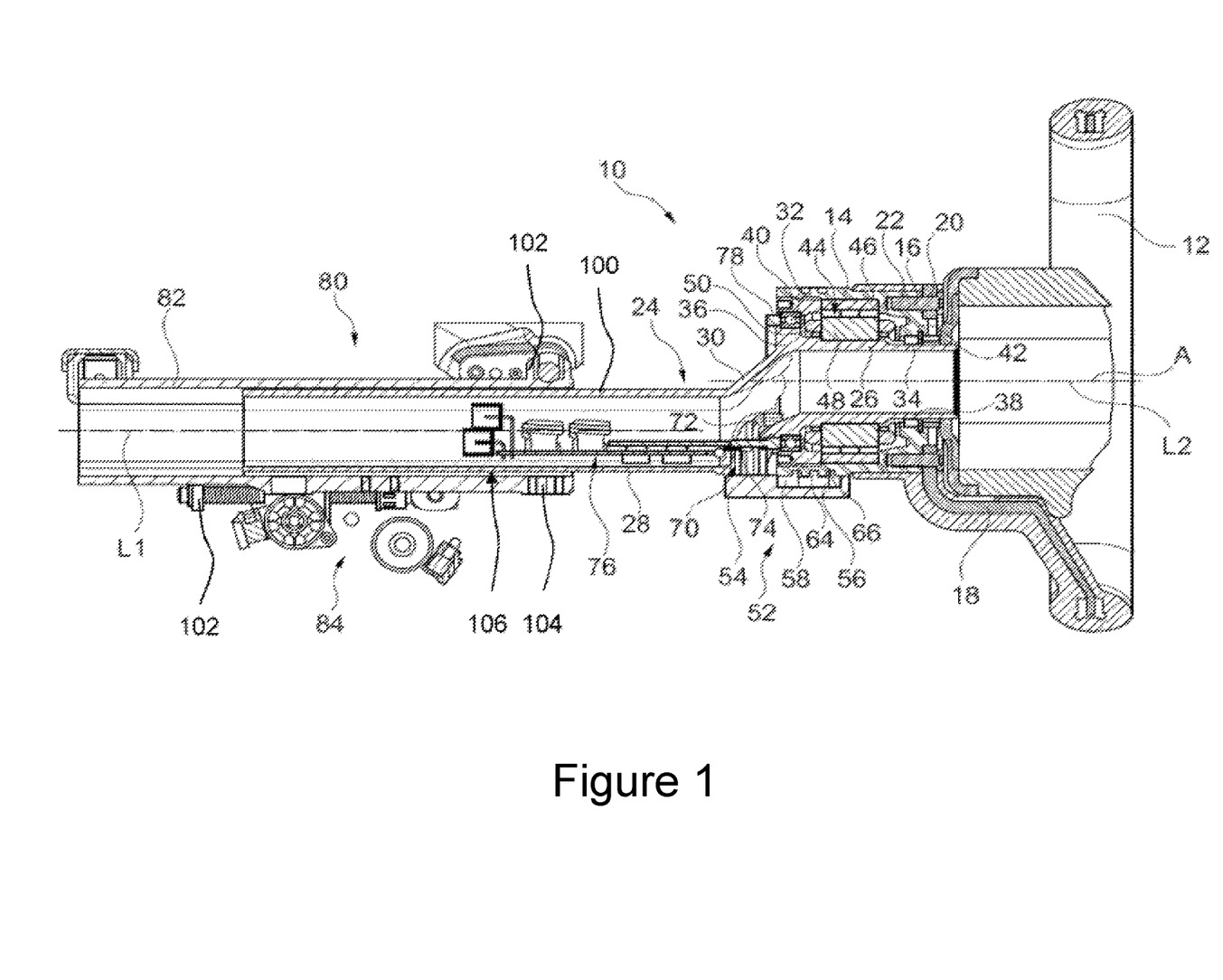
FIG. 1 shows a schematic sectional view of a steering system comprising a steering column according to an embodiment of the present disclosure.

FIG. 1 shows a schematic sectional view of a steering system 10 for a road vehicle according to an embodiment of the present disclosure. The steering system 10 is a steer-by-wire steering system that has no direct mechanical connection for transferring a driver's steering commands from a steering wheel 12 of the steering system 10 to the wheels (not shown) of the vehicle. Instead, the mechanical connections are replaced by an electro-mechanical arrangement which, together with the steering system 10, is part of the steer-by-wire steering system.

In addition to the steering wheel 12, the steering system 10 comprises a steering wheel hub 14 mechanically connected with the steering wheel 12. The steering wheel hub 14 and the steering wheel 12 are non-rotatable relative to each other, but can be rotated together about an axis of rotation A. The steering wheel 12 is removably attached to the steering wheel hub 14 in a non-rotatable manner by fixing elements 16 in form of screws. More precisely, the steering wheel 12 is provided with an internal armature 18, wherein the fixing elements 16 extend through through bores 20 of the internal armature 18 into internally threaded blind holes 22 provided in the steering wheel hub 14.

The steering wheel hub 14 is rotatably supported on a rigid steering column 24 of the steering system 10, more precisely on an aligned section 26 of the steering column 24. The steering column 24 may also be referred to as a steering system support column.

Besides the aligned section 26, the steering column 24 comprises an off-axis section 28 formed integrally with the aligned section 26 or formed separately and mechanically connected thereto. The off-axis section 28 is axially spaced from the aligned section 26 and from the steering wheel hub 14, while the steering wheel hub 14 overlaps and is located coaxial to the aligned section 26. The off-axis section 28 has a first longitudinal axis L1 that is off-set and parallel to the axis of rotation A. The aligned section 26 has a second longitudinal axis L2. The aligned section 26 of the steering system support column 24 is aligned with or coaxial to the steering wheel hub 14 and to the steering wheel 12, i.e. the second longitudinal axis L2 corresponds to the axis of rotation A.

The off-axis section 28 and the aligned section 26 are connected by a connection portion 30 extending transversally to both the first longitudinal axis L1 and the second longitudinal axis L2. The off-axis section 28 and the aligned section 26 are comprised by an inner steering column element 100.

The depicted angled configuration of the inner steering column element 100 provided by the off-axis section 28 and the aligned section 26 is merely optional. The inner steering column element 100 can equally configured as a non-angled straight member.

The steering wheel hub 14 is rotatably mounted on the aligned section 26 of the steering column 24 by a first bearing arrangement 32 and a second bearing arrangement 34, the second bearing arrangement 34 being axially spaced from the first bearing arrangement 32. For example, the first bearing arrangement 32 and/or the second bearing arrangement 34 can be a ball bearing or a roller bearing.

The first bearing arrangement 32 is supported on a protruding flange portion 36 of the aligned section 26 of the steering column 24, which protrudes radially outward from the outer circumferential surface of the aligned section 26. The protruding flange portion 36 provides a circular ring-shaped first bearing surface for supporting the first bearing arrangement 32. The protruding flange portion 36 is arranged in the vicinity of the connection portion 30, i.e. in a transition region between the aligned section 26 and the connection portion 30.

Consequently, the first bearing arrangement 32 is axially located at a first end portion of the aligned section 26 oriented towards the connection portion 30.

The second bearing arrangement 34 is supported on a circular ring-shaped portion 38 of the aligned section 26 of the steering 24. The circular ring-shaped portion 38 is formed in an area of the aligned section 26 following the steering wheel 12 and extending towards the protruding flange portion 36. The circular ring-shaped portion 38 provides a second bearing surface for the second bearing arrangement 34. Thus, the second bearing arrangement 34 is axially located at a second end portion of the aligned section 26 opposing the first end portion.

The first bearing arrangement 32 is mounted between the protruding flange portion 36 of the aligned section 26 and the steering wheel hub 14 via a support bushing 40 arranged between the first bearing arrangement 32 and the inner circumferential surface of the steering wheel hub 14.

The second bearing arrangement 34 is mounted directly between the circular ring-shaped portion 38 of the aligned section 26 and the steering wheel hub 14. To this, the steering wheel hub 14 is provided with an inwardly protruding flange portion 42 that provides a counter bearing surface for the second bearing arrangement 34. At the same time, the inwardly protruding flange portion 42 covers components located inside the steering wheel hub 14. As can be seen in FIG. 1, the blind holes 22 for receiving the fixing elements 16 extend into or through the inwardly protruding flange portion 42.

Generally, the inner steering column element 100 thus rotatably supports the steering wheel 12 at an outer circumferential surface of the inner steering column element 100. Unlike in various prior art solutions, the inner steering column element 100 does not rotatably support the steering wheel at its inner circumferential surface and generally does not receive any shaft or any member mechanically connected to the steering wheel 12 and/or to steered wheels of the vehicle on its inside.

The steering system 10 further comprises a torque feedback device 44 including an electric machine having a rotor 46 and a stator 48 with stator windings 50. The torque feedback device 44 can be operated to produce resistance torque to the rotation of the steering wheel 12 so as to simulate the resistance torque present in conventional steering systems. In other words, the torque produced by the torque feedback device 44 can counteract the rotational force applied to the steering wheel 12 by a driver.

In the shown embodiment, the electric machine is an outer rotor electric machine comprising an outer rotor 46 and an inner stator 48. The rotor 46 is fixed to an inner circumferential surface of the steering wheel hub 14. Thus, the rotor 46 is rotatable together with the steering wheel hub 14 about the axis of rotation A. The rotor 46 is non-rotatable relative to the steering wheel hub 14. The stator 48 is fixed to the rotatably stationary (i.e. non-rotatable) aligned section 26 of the steering system support column 24. Thus, the steering wheel hub 14 and the rotor 46 can rotate together around the stator 48 and the aligned section 26.

The electric machine of the torque feedback device 44 is arranged inside the steering wheel hub 14. The torque feedback device 44 is radially enclosed and thus covered by the steering wheel hub 14 (the inner circumferential surface of the steering wheel hub 14) and the aligned section 26 of the steering system support column 24 (the outer circumferential surface of the aligned section 26). The torque feedback device 44 is axially located between the protruding flange portion 36 of the aligned section 26 and the circular ring-shaped portion 38 of the aligned section 26. The torque feedback device 44 is axially enclosed and thus covered by the protruding flange portion 36 of the aligned section 26, the first bearing arrangement 32 and the support bushing 40 on one side and by the inwardly protruding flange portion 42 of the steering wheel hub 14 and the second bearing arrangement 34 on the other side.

The arrangement, configuration and support of the steering wheel hub 14, the steering wheel 12, the torque feedback device 44 and the steering column 24 provides a very compact structure. More precisely, as shown in FIG. 1, various components are arranged at least partially parallel to each other, with respect to their radial and/or axial arrangement.

The steering system 10 further comprises a steering wheel rotation limiting device 52 for limiting rotation of the steering wheel hub 14 and the steering wheel 12. The steering wheel rotation limiting device 52 is fixed to the steering system support column 24 and is arranged radially offset to the steering wheel hub 14, more precisely adjacent to the outer circumferential surface of the steering wheel hub 14. The steering wheel rotation limiting device 52 is non-rotatable relative to the steering system support column 24.

The steering wheel rotation limiting device 52 comprises a base 54 and a sliding element 56 arranged inside a compartment 58 formed in the base 54. The sliding element 56 is axially slidable relative to the base 54 and relative to the steering wheel hub 14. The sliding element 56 can slide between the two opposing end stop surfaces of the steering wheel rotation limiting device 52. The sliding element 56 comprises a projection 64 that engages a spiral groove 66 formed on the outer circumferential surface of the steering wheel hub 14. By the interaction of the projection 64 and the spiral groove 66, rotation of the steering wheel hub 14 causes axial movement of the sliding element 56.

Likewise, abutment of the sliding element 56 with one of the two end stop surfaces blocks further movement of the sliding element 56 in a certain direction and thus blocks further rotation of the steering wheel hub 14 in a certain direction of rotation. Hence, the steering wheel rotation limiting device 52 is configured to restrict rotation of the steering wheel hub 14 and of the steering wheel 12 connected therewith.

The base 54 of the steering wheel rotation limiting device 52 is fixed to the off-axis section 28 of the steering system support column 24 by screws (not shown). The steering wheel rotation limiting device 52, more precisely the base 54, extends in the axial direction from the off-axis section 28 of the steering system support column 24 to the steering wheel hub 14 so that the compartment 58 is arranged between and enclosed by the base 54 and the outer circumferential surface of the steering wheel hub 14.

The base 54 of the steering wheel rotation limiting device 52 covers an opening 70 configured in the off-axis section 28 of the steering system support column 24. More precisely, the opening 70 is arranged in another transition region between the off-axis section 28 and the connection portion 30. The opening 70 provides access to electric machine phase connections 72 and to electric steering wheel angle sensor connections 74 for service and maintenance purposes. The electric machine phase connections 72 connect the electric machine of the torque feedback device 44 with a control unit/control electronics 76. The electric steering wheel angle sensor connections 74 connect a steering wheel angle sensor 78 with the control unit/control electronics 76.

The control unit 76 is arranged inside the hollow tubular off-axis section 28 of the steering system support column 24. More precisely, the control unit 76 is arranged in a portion of the off-axis section 28 close to the connection portion 30 so as to locate the control unit 76 and the electric machine close to each other.

The steering wheel angle sensor 78 is configured to measure a present steering angle and thus to detect the driver's steering command that is to be transmitted electronically to actuator/s for actuating/steering the wheels in line with this command. The steering wheel angle sensor 78 is arranged adjacent or lateral to the first bearing arrangement 32.

The steering column 24 is formed as a tubular (i.e., hollow) telescope arrangement 80 that comprises the inner steering column element 100 and an outer steering column member 82. The inner steering column element 100 may also be referred to as a steering wheel support element and the outer steering column member 82 may also be referred to as a vehicle support element. A portion of the inner steering column element 100 facing away from the steering wheel 12 is inserted into and received by the outer steering column member 82.

The inner steering column element 100 is axially displaceable relative to the still standing outer steering column member 82 along the displacement axis L1 and relative to a vehicle body, but is non-rotatable and non-pivotable relative to the outer steering column member 82.

In the shown example, the optional off-axis section 28 is mounted axially slidable inside the outer steering column member 82 of the tubular telescope arrangement 80.

In an implementation mode, the steering column 24 is connected to the vehicle body (not shown) by brackets 102 formed at the outer steering column member 82 and connected to axial adjustment elements 84 (see lower bracket 102 in FIG. 1) and vertical adjustment elements (see upper bracket 102 in FIG. 1). Consequently, the inner steering column element 100 and all components supported thereon are only translationally displaceable with respect to and along the first longitudinal axis L1 independent of the vehicle support column 82. Further, the inner steering column element 100 and all components supported thereon are radially displaceable/pivotable relative to the vehicle body dependent on the outer steering column member 82, i.e. the adjustability/displaceability of the outer steering column member 82.

Still further, in FIG. 1 a position of a preload force generating element 104 is indicated. The preload force generating element 104 is a screw received in and extending through a threaded hole in the outer steering column member 82. Thus, the preload force generating element 104 contacts a sliding surface 106 of the inner steering column element 100 to generate frictional forces. These set a defined resistance against the sliding displacement of the inner steering column element 100 relative to the outer steering column member 82.

Figure 2:
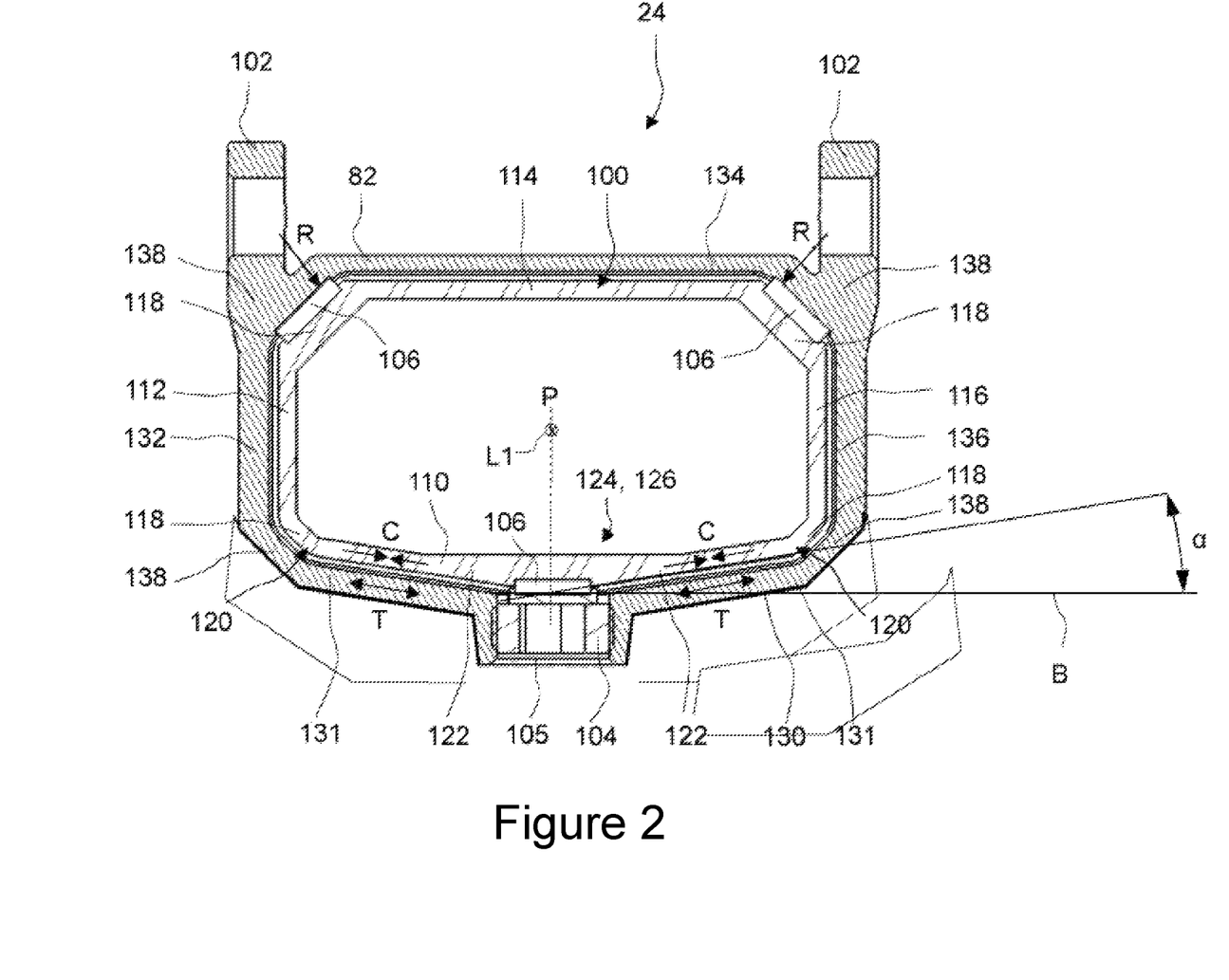
FIG. 2 shows a schematic cross-sectional view of the steering column of FIG. 1.

FIG. 2 is a cross-sectional view of the steering column 24 with the cross-sectional plane extending through the preload force generating element 104 and orthogonally to the displacement axis L1.

It again becomes apparent that the inner steering column element 100 and the outer steering column member 82 are both shaped as hollow tube-like members and in particular as hollow elongated metallic profiles.

The cross-section of the inner steering column element 100 has a substantially rectangular shape. It comprises four side faces 110, 112, 114, 116 that are connected to each other at corner portions 118. A left and right side face 112, 116 extent upright and/or vertically as well as in parallel to one another. A top and bottom side face 114, 110, the bottom side face 110 being a first side face of the inner steering column element 100, extend substantially horizontally and connect the left and right side faces 112, 116.

The left and right side faces 112, 116 and the top side face 114 are straight. The first side face 110, on the other hand, has an angled configuration and is generally outwardly bulging and/or convexly shaped. The first side face 110 defines a width of the inner steering column element e.g. has a length (in the horizontal direction) of between 50 mm and 150 mm.

Specifically, the first side face 110 comprises two outer edge portions 120 at opposite outer ends thereof which connect to and/or are comprised by the corner portions 118. In between (or starting from) these two edge portions 120, two angled sections 122 converge towards a centre portion 124 of the first side face 110. The centre portion 124 is positioned opposite to the preload force generating element 104 and forms a lowermost or outermost portion of the first side face 110. The angled sections 122 extend downwards or outwards relative to the outer edge portions 120, so that the first side face 110 generally protrudes towards the preload force generating element 104. Put differently, a protruding portion of the first side face 110 generally covers the complete first side face 110 and/or contains the complete outer surface of said first side face 110. This, however, is not mandatory and the first side face may alternatively have non-angled horizontally portions which are connected to a locally protruding centre portion 124.

In an implementation mode, the shape of an inner surface of the first side face 110 slightly deviates from the shape of the outer surface in that it is provided with a horizontal section 126 that spans across the centre portion 124.

The cross-section of the outer steering column element 82 is shaped substantially similar to that of the inner steering column element, except for the optional and only locally provided brackets 102. In particular, a shape of in inner circumferential surface of the outer steering column element 82 matches the shape of an outer circumferential surface of the inner steering column element 100.

In consequence, the cross-section of the outer steering column element 82 likewise comprises a number of side faces 130, 132, 134, 136 forming a rectangular (in particular inner) cross-section. Each side face extends along a directly adjacent similarly shaped and/or similarly oriented side faces 110, 112, 114, 116 of the inner steering column element 100. Also, the side faces 130, 132, 134, 136 are connected to one another at corner portions 138 of the outer steering column element 82.

A lower side face 130 of the outer steering column element 82 that extends along the first side face 110 of the inner steering column element 100 has a similarly angled and outwardly protruding shape (e.g. outwardly relative to a geometric centre of the inner and/or outer steering column element 100, 82 at which the displacement axis L1 is positioned in FIG. 2). A threaded through hole 105 is provided in a centre portion of said lower side face 130 in which the preload force generating element 104 is received. In the sectional view of FIG. 2, an internal hexagon profile or socket of the preload force generating element 104 is visible which is configured to receive a correspondingly shaped tightening tool.

An end portion of the preload force generating element 104 reaches into the outer steering column element 82 and contacts a sliding surface 106 comprised by the first side face 110 of the inner steering column element 100.

In an implementation mode, two further sliding surfaces 106 are shown. These are comprised by two corner portions 118 of the inner steering column element 100 to which the first side face 110 is not connected, i.e. that are positioned opposite to said first side face 110.

Each of the sliding surfaces 106 contact the inner surface of the outer steering column element 82. In an implementation mode, they form the only points of contact between the inner and outer steering column element 100, 82. The inner steering column element 100 is thus reliably supported at at least three points of contact by the outer steering column element 82 which enables a secure axial displacement.

When tightening the preload force generating element 104, a preload force is exerted onto the sliding surface 106 comprised by the first side face 110. The preload force acts along a preload axis P towards the interior of the steering column 24. The preload axis P extends in parallel to the left and right side faces 112, 116 and/or orthogonally to the upper side face 114. It may be a vertical axis.

In FIG. 2, an angle α of the angled sections 122 with respect to an axis B extending orthogonally to the preload axis P and to the displacement axis L1 is indicated. The angle α may be between 0.5° and up to and including 60°, e.g. between 10° and 50°. It is noted that the side face 130 of the outer steering column element 82 opposite the first side face 110 has similar angled sections 131 whose respective angles are, however, not specifically indicated.

As a result of the outwardly protruding shape of the inner steering column element 100, the preload force does not cause a substantial bending of the non-planar first side face 110 and/or side face 130. Instead, the first side face 110 mainly experiences compression loading as indicated by respective arrows C. These compression forces may be compensated for with a reduced material thickness of the first side face 110 compared to a case where said first side face 110 would experience a substantial bending.

Further, the upper sliding surfaces 106 experience pressure reaction forces indicated by arrows R. These are introduced in the planar sliding surfaces 106 without causing substantial deformation of the inner steering column element 100.

The outer steering column element 82 and in particular the angled portions 131 of its lower side face 130 mainly experience tension loading as indicated by arrows T. Again, however, they are not significantly bent which allows for reducing the material thickness of said side face 130.

While the embodiment shows an outwardly protruding first side face 110, an inwardly protruding shape is also possible and can provide similar advantages in view of stiffness. This may e.g. be achieved by mirroring the angled sections 122, 131 at the axis B or at an axis parallel thereto, thereby providing an inverted V-shape.

LIST OF REFERENCE SIGNS 10 steering system
12 steering wheel
14 steering wheel hub
16 fixing elements
18 armature
20 through bores
22 blind holes
24 steering column
26 aligned section
28 off-axis section
30 connection portion
32 first bearing arrangement
34 second bearing arrangement
36 protruding flange portion
38 circular ring-shaped portion
40 support bushing
42 inwardly protruding flange portion
44 torque feedback device
46 rotor
48 stator
W axial width
50 stator windings
52 steering wheel rotation limiting device
54 base
56 sliding element
58 compartment
64 projection
66 spiral groove
70 opening
72 electric machine phase connections
74 electric steering wheel angle sensor connections
76 control unit
78 steering wheel angle sensor
80 tubular telescope arrangement
82 Inner steering column element
84 adjustment elements
86 internal space
88 end portion
C compression forces
T tensile forces
R reaction force
P preload axis
100 inner steering column element
102 bracket
104 preload force generating element
105 through hole
106 slide surface
110-116 side surface
118, 138 corner portion
120 outer edge portion
122, 131 angled section
126 horizontal section
130-136 side surface
A axis of rotation
AS axial direction
L1 first longitudinal axis
L2 second longitudinal axis
B axis relative to which angled sections are angled
α angle

What is claimed is:

1. A steering column for a vehicle, with:
an inner steering column element that is received in an outer steering column element, the inner and outer steering column element being displaceable relative to one another along a displacement axis;
at least one preload force generating element that is configured to generate a preload force to set a defined resistance against the relative displacement;
wherein the inner steering column element has a number of side faces which form a hollow cross-section of the inner steering column element;

wherein at least a portion of a first side face of the number of side faces has a protruding shape;

wherein the first side face has two outer edge portions which are each connected to one further side face of the inner steering column element, wherein at least one protruding portion of the first side face protrudes relative to the two outer edge portions towards the preload force generating element; the two outer edge portions and the preload force generating element do not overlap in a direction of an axis extending orthogonally to the displacement axis.

2. The steering column according to claim 1, wherein the portion of the first side face protrudes towards the preload force generating element.

3. The steering column according to claim 1, wherein the hollow cross-section has a polygonal and/or a substantially rectangular shape.

4. The steering column according to claim 1, wherein at least one of the side faces other than the first side face has a substantially planar shape.

5. The steering column according to claim 1, wherein the first side face has an angled shape.

6. The steering column according to claim 5, wherein the first side face has two converging angled sections that merge at a centre portion which is arranged opposite the preload force generating element.

7. The steering column according to claim 5, wherein the preload force acts along a preload axis and a shape of the first side face is angled with respect to the axis extending orthogonally to said preload axis and to the displacement axis.

8. The steering column according to claim 6, wherein the angled sections are mirror symmetric with respect to the preload axis.

9. The steering column according to claim 7, wherein the angle of each angled section with respect to the axis extending orthogonally to said preload axis and to the displacement axis is between 0.5° and 60°.

10. The steering column according to claim 7, wherein the angle of each angled section with respect to the axis extending orthogonally to said preload axis and to the displacement axis is between 10° and up to 45°.

11. The steering column according to claim 1, wherein the first side face is a top side face or a bottom side face of the inner steering column element with respect to an installation orientation of the steering column in the vehicle.

12. The steering column according to claim 1, wherein the preload force generating element is a screw or comprises a screw.

13. The steering column according to claim 1, wherein the first side face comprises at least one sliding surface into which the preload force is introduced.

14. The steering column according to claim 13, wherein the first side face comprises at least two further sliding surfaces each positioned at a corner portion of the hollow cross-section of the inner steering column element, wherein the first side face is spaced apart from said corner portions.

15. The steering column according to claim 1, wherein the outer steering column element has a number of side faces which form a hollow cross-section of the outer steering column element, said cross-section receiving the inner steering column element, wherein a side face of the outer steering column element that is adjacent to the first side face of the inner steering column element is correspondingly shaped to said first side face.

16. A steering system for a vehicle, comprising:

a steering column according to claim 1;

a steering wheel coupled to the inner steering column element and being rotatable relative thereto.

* * * * *